UNITED STATES PATENT OFFICE.

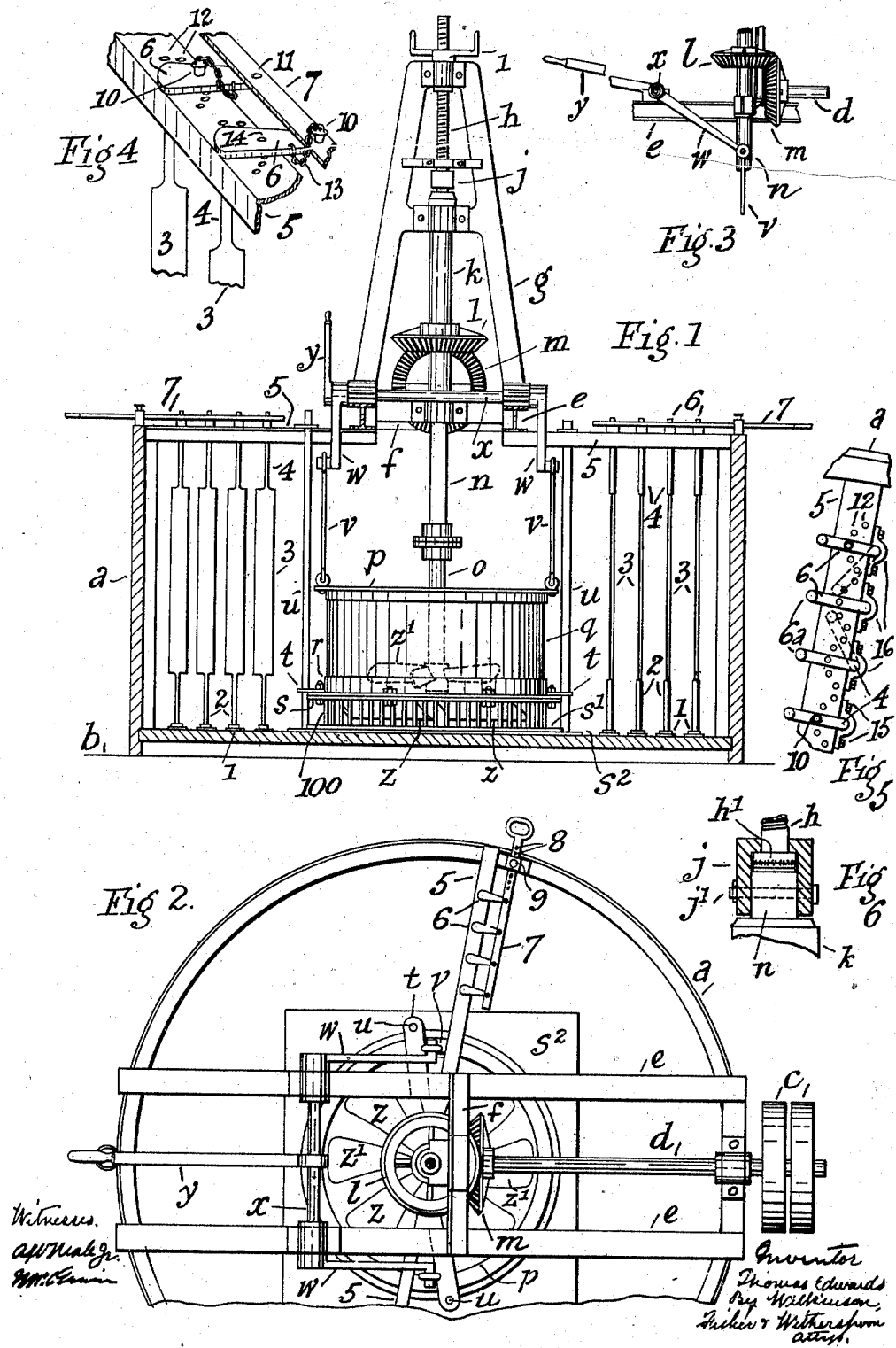

THOMAS EDWARDS, OF BALLARAT, VICTORIA, AUSTRALIA.

AGITATOR AND DISINTEGRATOR.

967,743.  Specification of Letters Patent. Patented Aug. 16, 1910.

Application filed December 24, 1909. Serial No. 534,884.

*To all whom it may concern:*

Be it known that I, THOMAS EDWARDS, a subject of the King of Great Britain and Ireland, &c., residing at Ballarat, in the State of Victoria, Commonwealth of Australia, have invented certain new and useful Improvements in and Relating to Agitators and Disintegrators Usable in Conjunction with Cyanid or other Processes; and I do hereby declare the following to be a full, clear, and exact description of the invention, such as will enable others skilled in the art to which it appertains to make and use the same.

My invention relates to disintegrating and agitating—whether in conjunction with cyaniding, chlorinating, or so on—or not; it enables treatment of many kinds of material and serves for dealing with hardened or concreted slime to economically produce, in combination with liquid, as water or solution, pulp that is homogeneous, or as nearly so as the material allows. The more even the consistency of the pulp the shorter the time required for extraction to take place by solvent solution; higher extraction is also obtained. Large quantities of auriferous and other mineral refuse, such as slimes, exist, which, by atmospheric or other agency, have become hardened and concreted, and been abandoned or neglected as incapable of, or refractory to profitable treatment.

By my invention such material may, when cheap pulping is the economy desired, be easily and profitably dealt with.

I provide special means to deal with stones and the like, which may enter, but will not disintegrate in my machine.

My machine may be made to work on a very large or any smaller scale, and will withstand severe usage and prolonged wear. It will cost comparatively little to construct and maintain, and is free from delicate or complex details.

The accompanying drawings illustrate construction I may employ.

In these, Figure 1 shows a machine in side elevation partly sectional, and Fig. 2 is a plan view showing parts of Fig. 1. Figs. 3 to 6 show details, some being drawn on a larger scale.

In these views $a$ indicates a vessel or vat of metal or any appropriate material, size or form, any suitable covering and one or more exits, not shown, being used at will, $b$ being any suitable support. Within the vat is a cage 100 below and connected to a chamber $q$, shown as a cylinder. Located within the said cage and chamber at any suitable height are a plurality of propellers $z$, $z^1$, with blades of any suitable number, disposition, and shape, those common in ships being serviceable. By having one set of propellers above another, the flukes or blades of one set can be set in any desired position relative to those of the set below it. I find they act well when intermediate as illustrated in Fig. 2, the upper propeller blades being marked $z^1$. Means for adjustment and operation of these propellers are provided, as any driving means such as fast and loose pulleys $c$ on shaft $d$, which drives bevel wheel $m$ and thereby bevel wheel $l$ geared thereto and keyed to sleeve $k$.

$g$ is a tower or frame mounted on supports as girders $e$, a cross beam $f$ carrying a shaft bearing.

There are adjustment means shown in Fig. 4, (as a series of cranks 6) to operate a series of metal or other baffles 3, within the tank. The propellers swirl solid and liquid matter toward the vat wall, but baffles 3 intercept said matter more or less and prevent the swirl sweeping around the said wall objectionably. Fig. 1 shows two sets of baffles, but there may be any number of sets.

The baffles may be plates bolted or connected to spindles 4, 2, or integral with them.

5 are means as angle irons carrying the spindle upper ends; the bottoms of the baffles or their spindle bases 2, are supported or secured in any convenient method as by resting the latter in sockets 1, or holes which allow them to turn to any desired angle. The baffles are made removable at will, for example as shown in Fig. 5, the details of which are further described later.

The ore cannot pack or bank itself against the baffles, or escape violent agitation by their aid. The propellers can, as hereinafter referred to, be raised. I have used propellers adapted to be raised for many months, and do not claim such broadly.

The cranks or arms 6, are arranged to be movable collectively, as by bar 7 to which arms 6 connect, or in desired groups, or singly. An operator can thereby deflect the currents of material in the vat to increase or diminish the distintegration and modify the swirl at will. He can shake the baffles to and fro also at any time. Bar 7 may be adjusted as by removable pin 9 passing through one of the holes 8 in said bar and a hole in any suitable member, as the tank upper rim. Pins 10 on chains or the like 13 can be left in or out of the holes as 11 in bar 7, and the baffle plates may be left free to turn; or pins 10 can be put through holes as 14 in arms 6, and also holes 12 in member 5 to fix the baffle plates.

Cylinder $q$ acts as a conductor of material to the propellers, and as a disintegrator. It has an angle iron or suitable top ring $p$ and base $r$, and ears $t$; it is sometimes made of plate iron. Cage 100 having top ring $s$, connected to ring $r$ or the like, and ring $s^1$ resting on the vat bottom, is of metal bars, or lattice work, or so on, of any suitable shape, shown circular, but may be polygonal, for example.

Lumps of material in the vat will be projected by the action of the propellers $z$, $z^1$, against the cage bars, and be broken up; and pass outside the bars and strike the baffle plates and become further disintegrated; some then pass inward over the top of chamber $q$, descend therein, and disintegration proceeds further, until the desired pulp is the result. Some material will strike the chamber $q$ interior (which in some cases is roughened or has attached or integral projections or surfaces suited for disintegrating purposes), and be broken thereby, and will then fall, and eventually be forced through the cage. Stones which will not pass out through the cage and large lumps which will not do so as soon as desirable, to give the propellers free play, are caused to move to the space outside of the cage by lifting the said cage (or cage and cylinder) without stopping the propellers. Lifting means are described hereinafter.

The bosses of two propellers are keyed one above another usually, on a shaft $o$, coupled to an angular as a square or other suitable shaft $n$, which turns with, fits in, and passes through a sleeve $k$ which the driving means or pulley will rotate in any suitable bearings. Any device may be used, instead of the sleeve and attached details shown, which will conveniently produce the desired rotation of the propellers. Shaft $n$ is connected to a screw $h$ by any suitable means which allow parts $n$, $k$ to revolve, while screw $h$ remains idle. Fig. 6 shows the top of shaft $n$, pinned at $j^1$ in a cap $j$, in which an enlargement or head $h^1$ on the lower end of the screw $h$ is located, the cap having an aperture for the screw to pass through, except the said head. It will now be obvious that by turning that screw as by handle $i$ the propellers are raised or lowered to work at different heights in the vat. By being raised and lowered they modify, stop, or restart the disintegration or effect agitation as predetermined. The propellers when set high, will be above the level which the ore on settling, reaches, if desired.

Any suitable means is used to prevent undue friction on the screw head. Thus there are one or more loose washers or disks $h^1$ upon shaft $n$, and between the upper disk and the base of the screw head, ball bearings.

Disintegrated pulp is allowed to settle for a time in the vat if desired, decantation is effected, or filtration into another vat, or the material is otherwise disposed of.

Fig. 2 illustrates the 4 bladed propeller $z^1$, fixed on shaft $o$, at a higher level than another 4 bladed propeller $z$; it is not essential that both propellers be similar but I have found similar ones to work well.

$s^2$ is any suitable wear plate on the vat bottom which is used when desired. The sizes of the cage openings, laterally and vertical, and the height of the cage and of chamber $q$, and the sizes, and form, and minor details of other parts of the construction may be modified while retaining any combination I claim. Thus in Fig. 1 a lever $y$ is shown at the side of spindle $x$, while in Fig. 2 it is shown central. Thus also I may at will remove the cage 100 illustrated, and substitute another having different dimensions and arrangements, but nevertheless similar in disintegrating action, and obviously usable.

$v$ are links connecting chamber $q$ with any suitable arms $w$ on a spindle $x$ suitably movable by a lever $y$ to raise or lower the said chamber and cage 100. But the cage may be so modified and arranged, if desired, that it alone will be raised.

When even one set of propellers is used, good results are obtainable.

The baffles shown are broad faced and narrow edged, and are made removable in any suitable way. Thus in Fig. 5 their spindles are secured by clamps or bearings 16 (detachable by removing nuts 15) on the sides of angle irons or other supports 5. In this view the cranks or arms 6 are by handles or ends 6$^a$ independently movable with means, as holes and pins, to fix them in some suitable adjustment, for example as dotted.

Baffles which are vertical as shown by me and adjustable while the machine is in action are superior to others.

What I claim as my invention and desire to secure by Letters Patent of the United States is:—

1. In an agitator and disintegrator, the combination of a vat, a chamber centrally located therein, propellers in said chamber, and means for operating said propellers, substantially as described.

2. In an agitator and disintegrator, the combination of a vat, disintegrating means in the center of said vat, and adjustable baffle plates outside of said means, substantially as described.

3. In an agitator and disintegrator, the combination of a vat, propellers centrally located therein, means for operating said propellers, series of baffle plates located outside of said propellers, and means for adjusting said baffle plates collectively or separately, substantially as described.

4. In an agitator and disintegrator, the combination of a vat, a central chamber therein having its lower end open, a cage surrounding the lower end of said chamber, a shaft, means for operating said shaft, and a series of propellers mounted on said shaft one above the other, the blades of the propellers alternating, substantially as described.

5. In an agitator and disintegrator, the combination of a vat, propellers centrally located therein, means for operating said propellers, a central cylindrical chamber, a cage surrounding the lower open end of said chamber, and means for raising and lowering said cage, substantially as described.

6. In an agitator and disintegrator, the combination of a vat, disintegrating means located in the center of said vat, devices for operating said means, and series of baffle plates having means for adjusting them individually and collectively, including arms or cranks connected to said baffle plates, respectively, a lever for operating said arms, and detachable connections between said arms and said lever, substantially as described.

7. In an agitator and disintegrator, the combination of a vat, disintegrating means in the center of said vat, and a series of adjustable baffle plates having broad faces and narrow edges, substantially as described.

In witness whereof I have hereunto set my hand in the presence of two witnesses.

THOMAS EDWARDS.

Witnesses:
GEORGE G. TURRI,
ALICE M. HOLT.